(12) United States Patent
Wei (10) Patent No.: US 9,784,614 B2
(45) Date of Patent: Oct. 10, 2017

(54) METHOD AND APPARATUS FOR COLOR MEASUREMENT OF NON-SOLID COLORS

(71) Applicant: Datacolor Holding AG, Lucerne (CH)

(72) Inventor: Hong Wei, Princeton, NJ (US)

(73) Assignee: DATACOLOR HOLDING AG, Lucerne (CH)

( * ) Notice: Subject to any disclaimer, the term of this patent is extended or adjusted under 35 U.S.C. 154(b) by 53 days.

(21) Appl. No.: 14/820,077

(22) Filed: Aug. 6, 2015

(65) Prior Publication Data

US 2016/0231170 A1    Aug. 11, 2016

Related U.S. Application Data

(60) Provisional application No. 62/113,684, filed on Feb. 9, 2015.

(51) Int. Cl.
*G01N 21/25* (2006.01)
*G01J 3/02* (2006.01)
*G01J 3/51* (2006.01)

(52) U.S. Cl.
CPC ............ *G01J 3/0251* (2013.01); *G01J 3/027* (2013.01); *G01J 3/51* (2013.01)

(58) Field of Classification Search
CPC .... G01J 3/0251; G01J 3/51; G01J 3/02; G01J 3/00; G01J 3/46; G01J 3/461; G01J 3/2803; G01J 3/2823; G01J 3/0254; G01J 2003/2826; G01J 3/50
See application file for complete search history.

(56) References Cited

U.S. PATENT DOCUMENTS

| | | | |
|---|---|---|---|
| 6,583,879 B1 * | 6/2003 | Berg | G01J 3/02 |
| | | | 250/226 |
| 7,119,930 B1 | 10/2006 | Carstensen et al. | |
| 2002/0018203 A1 | 2/2002 | Battle et al. | |
| 2005/0134853 A1 * | 6/2005 | Ingleson | G01J 3/0251 |
| | | | 356/402 |
| 2010/0195903 A1 | 8/2010 | Tani | |
| 2011/0249116 A1 | 10/2011 | Yamagishi | |
| 2014/0111985 A1 | 4/2014 | Harbers | |
| 2015/0198522 A1 | 7/2015 | Wei et al. | |

OTHER PUBLICATIONS

International Search Report and Written Opinion mailed Sep. 12, 2016 in corresponding PCT Application No. PCT/US2016/016599, pp. 1-12.

* cited by examiner

*Primary Examiner* — Jamil Ahmed (57) ABSTRACT

In one embodiment, an apparatus for measuring a color of a non-solid colored sample includes an integrating sphere having a sensor port, a sample port, and a plurality of registration marks affixed to an interior surface of the integrating sphere, outside a periphery of the sample port, a camera positioned near the sensor port, and a plurality of filters positioned between the integrating sphere and camera. An optical axis of the camera extends from the camera, through at least one of the plurality of filters, through the sensor port, to the sample port.

20 Claims, 5 Drawing Sheets

METHOD AND APPARATUS FOR COLOR MEASUREMENT OF NON-SOLID COLORS

CROSS REFERENCE TO RELATED APPLICATIONS

This application claims the benefit of U.S. Provisional Patent Application 62/113,684, filed Feb. 9, 2015, which is herein incorporated by reference in its entirety.

FIELD OF THE INVENTION

The present invention generally relates to the field of imaging, and more specifically relates to color measurement.

BACKGROUND

Color measurement systems help to improve operational efficiency and product quality in supply chains. For example, color approval offices for the global apparel supply chain, apparel mills and dye houses, paint stores, textile printing shops, carpet manufacturers, manufacturers of wood panels, tiles, vinyl sheets, and laminates, and other industries relying on the digital color workflow require accurate color evaluation and visualization.

Measurement of non-solid colors (e.g., multiple colors or color patterns) in a sample is typically more complicated than the measurement of solid colors. Conventional approaches to measuring non-solid colors often cannot produce repeatable results. For example, some approaches rely on a lighting geometry that varies with the position relative to the sample. Furthermore, such approaches fail to adequately capture the spectral diversity needed to estimate the spectral reflectance of the sample's surfaces.

SUMMARY OF THE INVENTION

In one embodiment, an apparatus for measuring a color of a non-solid colored sample includes an integrating sphere having a sensor port, a sample pork, and a plurality of registration marks affixed to an interior surface of the integrating sphere, outside a periphery of the sample port, a camera positioned near the sensor port, and a plurality of filters positioned between the integrating sphere and camera. An optical axis of the camera extends from the camera, through at least one of the plurality of filters, through the sensor port, to the sample port.

In one embodiment, a method for measuring a color of a non-solid colored sample includes positioning the sample near a sample port of an integrating sphere, illuminating the sample with diffuse illumination, using the integrating sphere, capturing a plurality of images of the sample through a sensor port of the integrating sphere, subsequent to the illuminating, wherein each image of the plurality of images is captured using a different color filter, wherein at least one of the plurality of images depicts a set of registration marks affixed to an interior surface of the integrating sphere, and computing a reflectance of a portion of the sample, based on the plurality of images.

In one embodiment, a computer readable storage device contains an executable program for measuring a color of a non-solid colored sample, where the program performs steps including positioning the sample near a sample port of an integrating sphere, illuminating the sample with diffuse illumination, using the integrating sphere, capturing a plurality of images of the sample through a sensor port of the integrating sphere, subsequent to the illuminating, wherein each image of the plurality of images is captured using a different color filter, wherein at least one of the plurality of images depicts a set of registration marks affixed to an interior surface of the integrating sphere, and computing a reflectance of a portion of the sample, based on the plurality of images.

In one embodiment, an apparatus for measuring a color of a non-solid colored sample includes an integrating sphere having a sensor port, a sample port, a plurality of registration marks affixed to an interior surface of the integrating sphere, outside a periphery of the sample port, and a light port, a light positioned near the light port, a camera positioned near the sensor port, and a plurality of filters positioned between the integrating sphere and the light source, wherein an optical axis of the camera extends from the camera, through the sensor port, to the sample port.

BRIEF DESCRIPTION OF THE DRAWINGS

The teachings of the present invention can be readily understood by considering the following detailed description in conjunction with the accompanying drawings, in which.

DETAILED DESCRIPTION

In one embodiment, the present invention is a method and apparatus for color measurement of non-solid colors. Embodiments of the invention use an integrating sphere to diffuse light, and then measure the color of a non-solid color sample using a monochrome camera that captures sequential images of the sample through multiple interference filters. The diffuse reflectance of individual pixels of pixel averages can then be inferred from the images.

Figure 1:
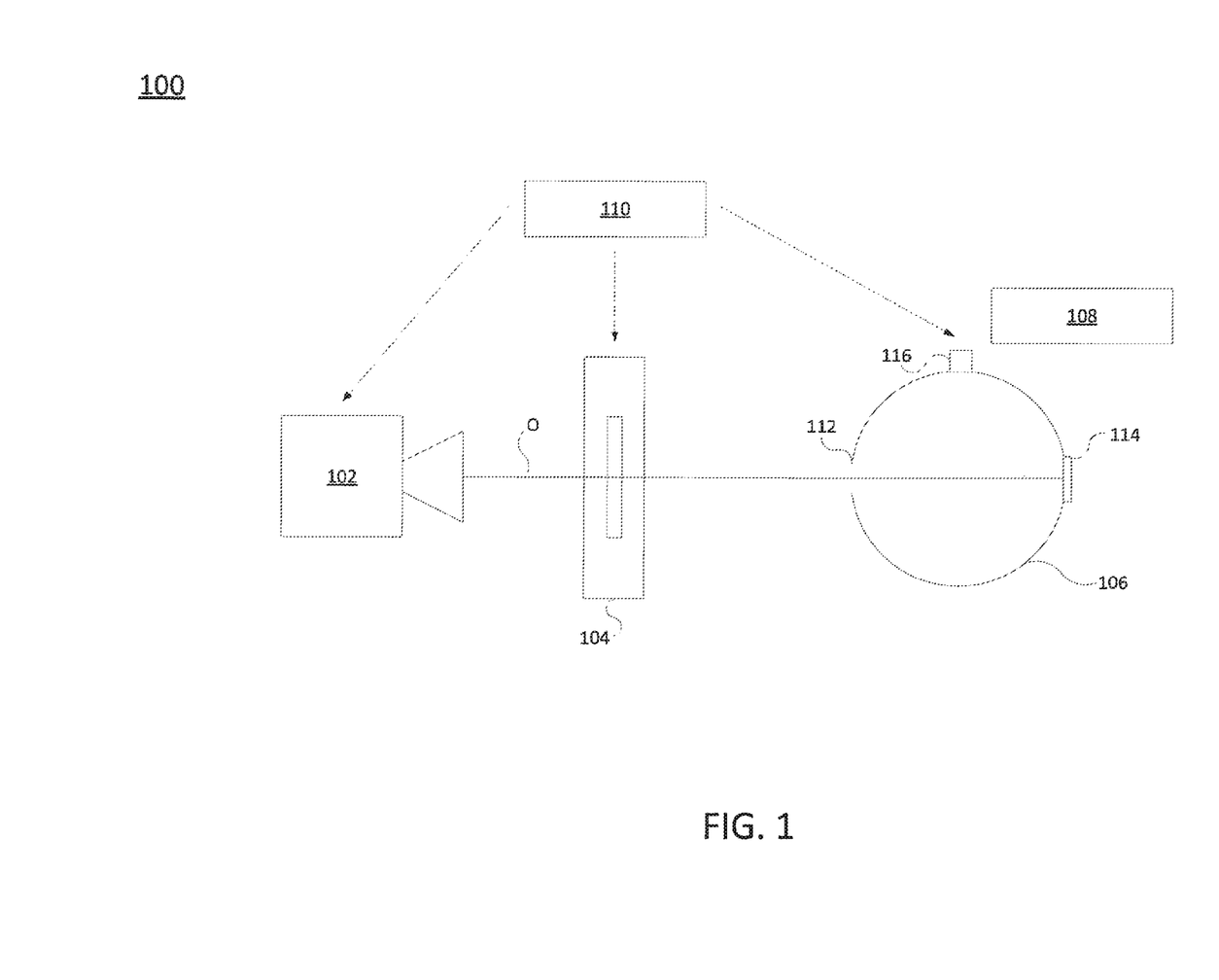
FIG. 1 is a block diagram illustrating one embodiment of a system for color measurement, according to the present invention.

FIG. 1 is a block diagram illustrating one embodiment of a system 100 for color measurement, according to the present invention. The system 100 is designed to measure the color of a sample, and may be especially suited for the measurement of non-solid colors (e.g., multiple colors or color patterns) in the sample. The system 100 generally comprises a camera 102, a set of filters 104, and an integrating sphere 106.

In one embodiment, the camera 102 is a monochrome camera. For instance, the camera 102 may be a scientific complementary metal oxide semiconductor (sCMOS) camera. In one embodiment, the lens configuration of the camera 102 may be optimized to reduce the specular reflection from the other optical components of the system 100.

The set of filters 104 is positioned in front of the lens of the camera 102, i.e., along the optical axis O of the camera 102. In an alternative embodiment, the set of filters 104 is positioned between the lens and the camera 102. In one embodiment the set of filters 104 includes a set of multiple different interference filters. The set of filters 104 may be implemented as a filter wheel, for example. In one embodiment, the transmission spectra of the filters are evenly spaced over substantially the entirety of the visible wavelength range (e.g., approximately 400 to approximately 700 nanometers). In a further embodiment, the transmission spectrum of each filter is approximately twenty nanometers wide. Thus, in one particular embodiment, the filter wheel includes at least sixteen possible positions, but may include more or less positions in other embodiments. In one embodiment, the filter wheel is configured such that only one position of the wheel (i.e., only one filter) may be positioned in the optical axis O of the camera 102 at a time.

The integrating sphere 106 is also positioned along the optical axis O of the camera 102, on the opposite side of the set of filters 104 from the camera 102 (i.e., such that the set of filters 104 is positioned between the camera 102 and the integrating sphere 106). In one embodiment, the integrating sphere 106 has a d/8° measurement geometry. The integrated sphere 106 includes a sensor port 112, a sample port 114, and a light port 116. The sensor port 112 and the sample port 114 are aligned with the optical axis O of the camera 102. In one embodiment, the sample port 114 is a large area of view (LAV) port (e.g., a port having an area of view of at least approximately thirty millimeters). In one embodiment, the light port 116 of the integrating sphere 106 includes one or more baffles (not shown) positioned to deflect illumination provided by a light source 108.

The light source 108 is positioned near the light port 116 to illuminate the interior of the integrating sphere 106. In one embodiment, the light source 108 is a full-spectrum light source, such as a xenon flash lamp or a full-spectrum light emitting diode (LED). For instance, the light source 108 may be an LED light source mounted in a luminaire whose front surface is flush with a diffuser, which is in turn flush with the light port 116. The LED itself may be positioned one to two centimeters outside the integrating sphere 106. Alternatively, the light source 108 may be a xenon flash mounted in a cavity that is placed nearly flush with the light port 116. Or, the light source 108 may be a xenon flash mounted in a cavity and coupled to the light port 116 via a fiber optic light guide. In any one of these configurations, the integrating sphere 106 may include a baffle to prevent direct illumination of the sample port 114 by the light source 108.

The camera 102, the set of filters 104, and the integrating sphere 106 are all coupled to a microprocessor 110 (or other computing device). The microprocessor 110 may control operation of the camera 102, the set of filters 104, and the integrating sphere 106.

In the illustrated embodiment, the components of the system 100 are arranged so that that optical axis O of the camera 102—which passes from the camera 102, through the filter wheel 104, and through the integrating sphere 106 to the sample positioned at the sample port 114—extends in a substantially parallel orientation (i.e., parallel within a few degrees of tolerance) relative to the ground or to a support surface upon which the system 100 is placed. This horizontal arrangement of components facilitates sample loading and unloading when the system 100 is in use.

Figure 2:
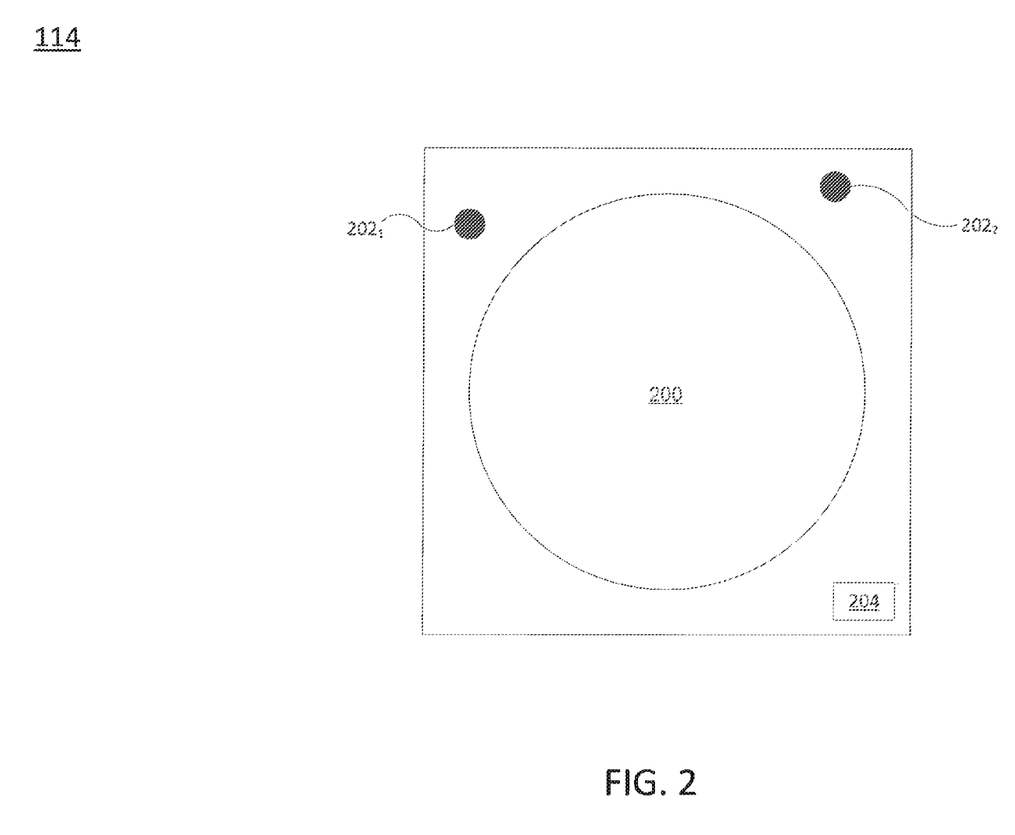
FIG. 2 is a schematic diagram illustrating an image of the sample port of the integrating sphere of FIG. 1 in greater detail

FIG. 2 is a schematic diagram illustrating an image of the sample port 114 of the integrating sphere 106 of FIG. 1 in greater detail. In particular, FIG. 2 illustrates an image of the sample port 114 as captured through the sensor port 112 of the integrating sphere 106. Thus, the image depicts the sample port 114 as seen from within the integrating sphere 106. As illustrated, the sample port 114 mainly comprises an aperture 200 formed in the body of the integrating sphere 106 and configured to receive the sample whose color is to be measured. In addition, the sample port 114 includes a set of image registration marks $202_1$-$202_3$ (hereinafter collectively referred to as "image registration marks 202").

In one embodiment, two of the image registration marks 202 are positioned outside a periphery of the aperture 200, on the interior surface of the integrating sphere 106 (i.e., image registration marks $202_1$ and $202_2$ in FIG. 2). These image registration marks 202 are used to correct for registration errors due to drift of the system 100 between capture of images. For instance, misalignment of the set of filters 104 may cause drift in the position and/or size of the images captured by the camera 102. The two registration marks 202 may be used to track the size and position of each image. In particular, the two image registration marks 202 provide four constraints (i.e., two constraints along the x axis, and two constraints along the y axis) and can correct for up to four registration errors (e.g., displacement along the x axis, displacement along the y axis, and image dilation/zoom). In a further embodiment, a third image registration mark $202_3$ may be positioned below aperture 200 and used to correct for rotation drift.

Because the intensity of the light source varies from one acquisition to the next, a reflecting area that doesn't change from flash-to-flash or from one sample to another is needed to compensate for the intensity variations. Accordingly, a reference channel is adopted as an imaged part of the integrating sphere outside the sample area. Light from the reference channel 204 is used to compensate for the intensity variations from one flash of light to the next. The reference channel 204 does not replace the white tile, because: (1) the reference channel 204 is not calibrated white; and 2) the white tile is acquired on a different flash than the sample, and so still requires compensation.

The reference channel area 204 is positioned outside a periphery of the aperture 200, and comprises a portion of the interior surface of the integrating sphere 106. The reference channel area 204 compensates for image-to-image variation in the intensity of the light source 108. The reference channel area 204 allows the reference channel to be measured simultaneously with the sample. The reference channel area 204 does not necessarily need to be a calibrated white.

The light intensity distributed over the sample port 114 may be non-uniform. The uneven distribution of illumination can be compensated for using images that are captured during conventional white tile calibration of the system 100. In one embodiment, the white tile is used as a grey card to calibrate the reflectance measurement at each pixel in an image of the sample port 114.

Figure 3:
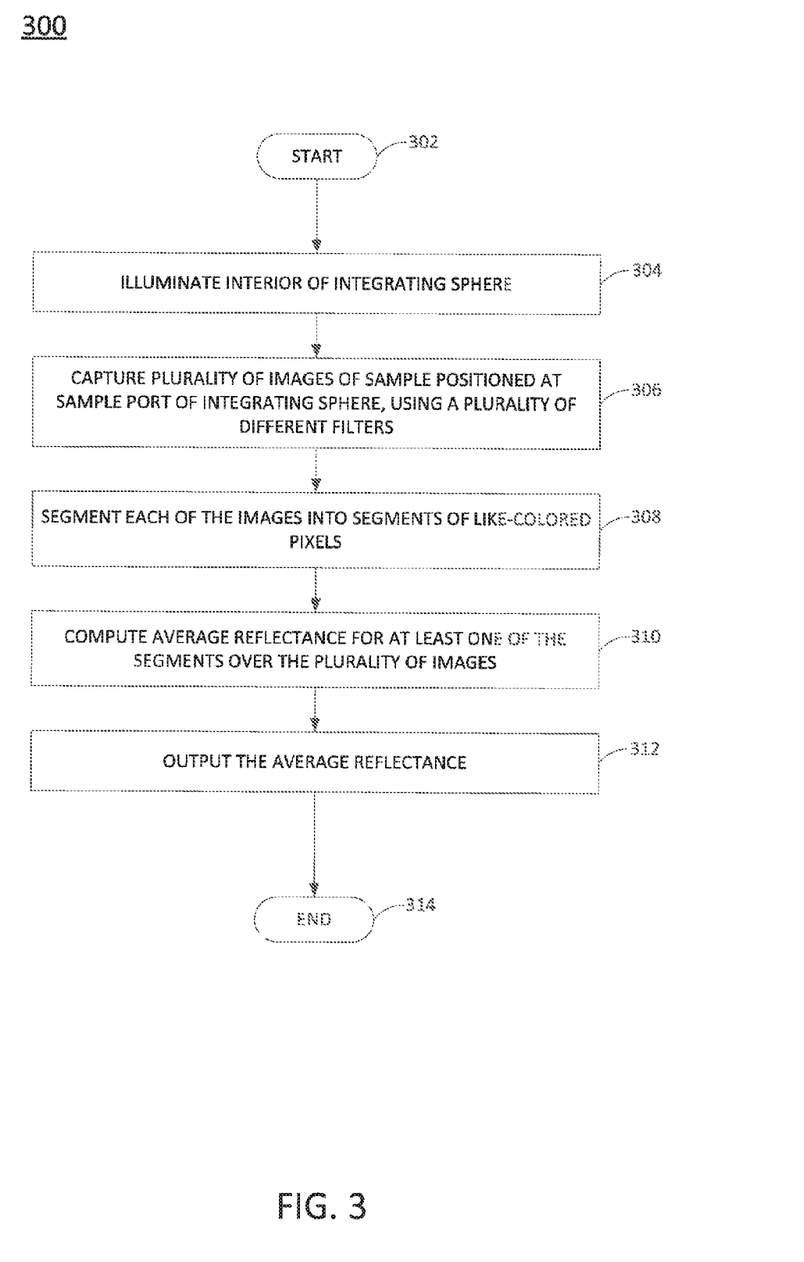
FIG. 3 is a flow diagram illustrating one embodiment of a method 300 for color measurement of non-solid colors, according to the present invention.

FIG. 3 is a flow diagram illustrating one embodiment of a method 300 for color measurement of non-solid colors, according to the present invention. The method 300 may be implemented, for example, by the system 100 of FIG. 1 (e.g., under the control of the microprocessor 110). Thus, reference is made in the discussion of the method 300 to various elements of FIG. 1. It will be appreciated, however, that the method 300 could be implemented by a system having a configuration that differs from the configuration illustrated in FIG. 1.

The method 300 assumes that certain steps have been performed in advance, including preparation and loading of the sample whose color is to be measured, and white reference target (e.g., tile) and black trap calibration of the color measurement system 100. Each of these steps may be performed in multiple different ways without departing from the scope of the present invention.

The method 300 begins in step 302.

In step 304, the interior of the integrating sphere 106 is illuminated. In one embodiment, the interior of the integrating sphere 106 is illuminated by the light source 108 positioned near the light port 116 of the integrating sphere. The illumination shines into the integrating sphere 106 in such a way that there is no direct path from the light source 108 to the sensor port 112 or to the sample port 114. For instance, the illumination may be deflected by one or more baffles. The illumination is thus diffused by multiple reflections from the interior of the integrating sphere 106 before it is incident on the sample positioned at the sample port 114. In one embodiment, the sample is a non-solid colored sample, such as a multi-colored or patterned textile sample.

In step 306, the camera 102 captures a plurality of images of the sample. The images are captured through the sensor port 112 of the integrating sphere 106. In one embodiment, each of the plurality of images is captured in a different band of the visible wavelength range (e.g., 400 to 700 nanometers). For instance, each image may be captured in a different twenty nanometer band of the visible wavelength range (e.g., 400 nm, 420 nm, . . . , 700 nm). In one embodiment, each image is captured by placing a different filter in the set of filters 104 in front of the lens of the camera 102.

In step 308, the microprocessor 110 computes the reflectance for at least one pixel of the images. In one embodiment, the reflectance of a pixel is computed by first computing the ratio of the light intensity reflected from the pixel to the light intensity reflected from a white reference target or tile (e.g., obtained during calibration) for each captured image. Thus, the ratio is computed through each filter in the set of filters 104. In one embodiment, the reference channel is used to correct this computation for fluctuations in light intensity that may occur between the time of white tile calibration and the time the images of the sample are captured.

In one particular embodiment, the sample reflectance, $R_S$, may be calculated from a known white reflectance, $R_W$ (measured by some reference instrument), and light intensities (various quantities I) measured by the camera 102 as:

$$R_S = [R_W(I_{s2}-I_k)(I_{r1}-I_k)]/[(I_{r2}-I_k(I_{w1}-I_k)] \quad \text{(EQN. 1)}$$

where a subscript of "2" denotes a time of acquisition of a test sample, and a subscript of "1" denotes a time of acquisition of the white tile W. The light intensities, I, are defined as follows:

$I_{w1}$ is the intensity from the white tile, measured at time 1.

$I_{s2}$ is the intensity from the test sample, measured at time 2.

$I_{r1}$ and $I_{r2}$ are the intensities from the reference channel measured at times 1 and 2, respectively.

$I_k$ is the intensity measured from the black trap, assumed to be independent of measurement time.

EQN. 1 is expressed entirely in terms of measured light intensities and one known white reflectance ($R_W$). It can be derived from the ratio of the following:

$$R_W = b(I_{w1}-I_k)/(I_{r1}-I_k) \quad \text{(EQN. 2)}$$

$$R_S = b(I_{s2}-I_k)(I_{r2}-I_k) \quad \text{(EQN. 3)}$$

Where b is a scale factor that includes two effects: (1) the reference channel signal is measured at a different location than the sample port; and (2) the reference channel reflectance is not a perfect reflecting diffuser. Evaluating the ratio of EQN. 3 to EQN. 2 eliminates the factor b.

Referring back to FIG. 3, in step 310, the microprocessor 110 outputs the reflectance values, e.g., to another computing device or tool.

The method 300 ends in step 312.

Figure 4:
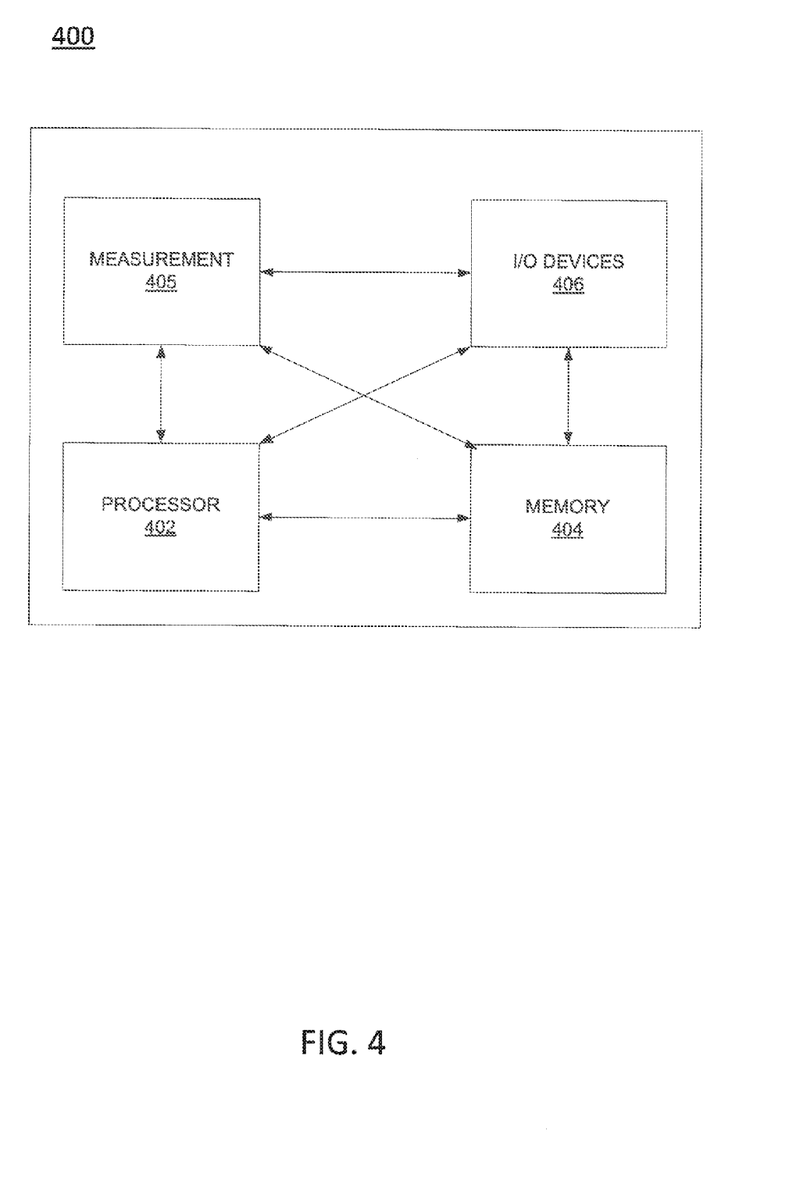
FIG. 4 is a high-level block diagram of the present invention that is implemented using a general purpose computing device.

FIG. 4 is a high-level block diagram of the present invention that is implemented using a general purpose computing device 400. The general purpose computing device 400 may comprise, for example, the microprocessor 110 illustrated in FIG. 1. Alternatively, the general purpose computing device 400 may be part of another computing device that is coupled to the system 100. In one embodiment, a general purpose computing device 400 comprises a processor 402, a memory 404, a measurement module 405 and various input/output (I/O) devices 406 such as a display, a keyboard, a mouse, a stylus, a wireless network access card, an image capturing device, and the like. In one embodiment, at least one I/O device is a storage device (e.g., a disk drive, an optical disk drive, a floppy disk drive). It should be understood that the measurement module 405 can be implemented as a physical device or subsystem that is coupled to a processor through a communication channel.

Alternatively, as discussed above, the measurement module 405 can be represented by one or more software applications (or even a combination of software and hardware, e.g., using Application Specific Integrated Circuits (ASIC)), where the software is loaded from a storage medium (e.g., I/O devices 306) and operated by the processor 402 in the memory 404 of the general purpose computing device 300. Thus, in one embodiment, the measurement module 405 for color measurement of non-solid colors as described herein with reference to the preceding Figures, can be stored on a computer readable storage device (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Figure 5:
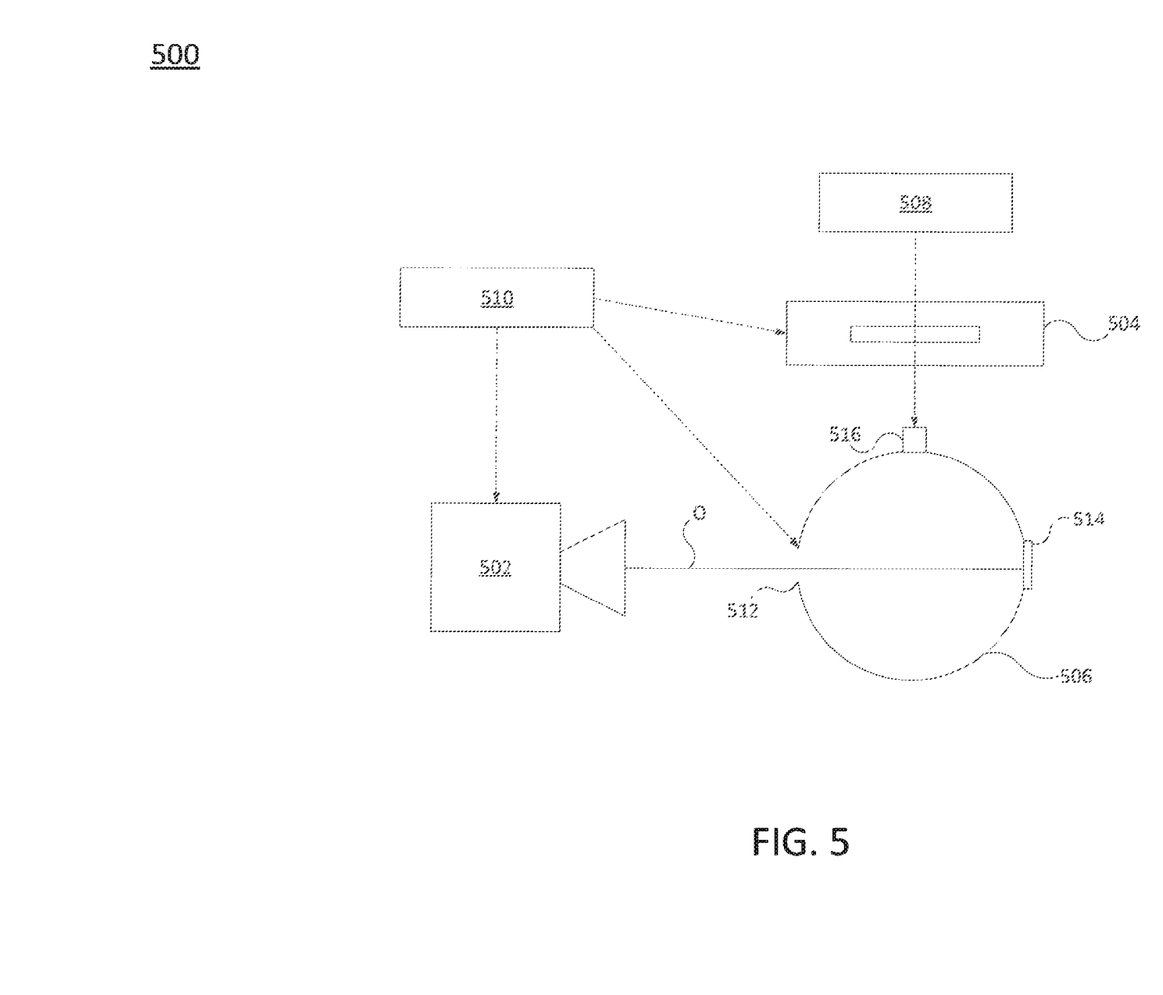
FIG. 5 is a block diagram illustrating another embodiment of a system for color measurement, according to the present invention.

FIG. 5 is a block diagram illustrating another embodiment of a system 500 for color measurement, according to the present invention. The system 500 is designed to measure the color of a sample, and, like the system 100, may be especially suited for the measurement of non-solid colors (e.g., multiple colors or color patterns) in the sample. The system 500 generally comprises a camera 502, a set of filters 504, and an integrating sphere 506.

In one embodiment, the camera 502 is a monochrome camera. For instance, the camera 502 may be a scientific complementary metal oxide semiconductor (sCMOS) camera.

The integrating sphere 506 is positioned along the optical axis O of the camera 502. In one embodiment, the integrating sphere 506 has a d/8° measurement geometry. The integrated sphere 506 includes a sensor port 512, a sample port 514, and a light port 516. The sensor port 512 and the sample port 514 are aligned with the optical axis O of the camera 502. In one embodiment, the sample port 514 is a large area of view (LAV) port (e.g., a port having an area of view of at least approximately thirty millimeters). In one embodiment, the light port 516 of the integrating sphere 506 includes one or more baffles (not shown) positioned to deflect illumination provided by a light source 508.

The light source 508 is positioned near the light port 516 to illuminate the interior of the integrating sphere 506. In one embodiment, the light source 508 is a full-spectrum light source, such as a xenon flash lamp or a full-spectrum light emitting diode (LED).

The set of filters 504 is positioned between the light source 508 and the integrating sphere 506. In one embodiment the set of filters 504 includes a set of multiple different interference filters. The set of filters 504 may be implemented as a filter wheel, for example. In one embodiment, the transmission spectra of the filters are evenly spaced over substantially the entirety of the visible wavelength range (e.g., approximately 400 to approximately 700 nanometers). In a further embodiment, the transmission spectrum of each filter is approximately twenty nanometers wide. Thus, in one particular embodiment, the filter wheel includes at least sixteen possible positions, but may include more or fewer positions in other embodiments. In one embodiment, the filter wheel is configured such that only one position of the wheel (i.e., only one filter) may be positioned at the light port 516 of the integrating sphere 506 at a time.

The camera 502, the set of filters 504, and the integrating sphere 506 are all coupled to a microprocessor 510 (or other computing device). The microprocessor 510 may control operation of the camera 502, the set of filters 504, and the integrating sphere 506.

Thus, the system 500 is configured in a manner similar to the system 100, except that the filters 504 are positioned at the light input (i.e., between the light source 508 and the integrating sphere 506), rather than at the sensor output (i.e., between the camera 102 and the integrating sphere 106). Positioning the filters 504 to filter the light source 508 may limit the amount of light that enters the integrating sphere 506, thereby minimizing the amount by which the integrating sphere 506 heats up. The filters themselves are unlikely to heat up despite their proximity to the light source 508, because they are interference filters which reflect (i.e., do not absorb) light that is not transmitted.

The system 500 may be operated in a manner substantially similar to the system 100. Thus, the method 300, discussed above, may also be implemented by the system 500 of FIG. 5 (e.g., under the control of the microprocessor 510). However, where the plurality of images is captured in step 306, each image is captured by placing a different filter in the set of filters 104 in front of the light port 516 of the integrating sphere 506, rather than in front of the lens of the camera.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the Figures, and as such these terms may be interchangeable.

What is claimed is:

1. An apparatus for measuring a color of a non-solid colored sample, the apparatus comprising:
    an integrating sphere comprising:
        a sensor port;
        a sample port; and
        a plurality of registration marks affixed to an interior surface of the integrating sphere, outside a periphery of the sample port, wherein the plurality of registration marks comprises:
            a first registration mark having a first center;
            a second registration mark having a second center that is non-overlapping with the first center, where the first registration mark and second registration mark collectively provide four constraints for correcting up to four registration errors in an image, wherein the up to four registration errors include at least one of: a displacement of the image along an x axis of a coordinate plane, a displacement of the image along a y axis of the coordinate plane, and a dilation of the image; and
            a third registration mark providing a constraint for correcting a rotation drift of the image;
    a camera positioned near the sensor port; and
    a plurality of interference filters positioned between the integrating sphere and camera.

2. The apparatus of claim 1, wherein the camera is a monochrome camera.

3. The apparatus of claim 1, wherein the plurality of interference filters is configured as a filter wheel.

4. The apparatus of claim 1, wherein transmission spectra of the plurality of interference filters are spaced over a range covering all visible wavelengths of light.

5. The apparatus of claim 4, wherein the range is approximately 400 to approximately 700 nanometers.

6. The apparatus of claim 1, further comprising:
    a light source positioned near a light port of the integrating sphere.

7. The apparatus of claim 6, wherein the light source is a full-spectrum light source.

8. The apparatus of claim 6, wherein the light source is a xenon flash lamp.

9. The apparatus of claim 6, wherein the light source is a full-spectrum light emitting diode.

10. The apparatus of claim 1, further comprising:
    a reference channel comprising a portion of the interior surface of the integrating sphere and positioned outside the periphery of the sample port.

11. The apparatus of claim 1, wherein an optical axis of the camera extends in a parallel orientation relative to a support surface upon which the apparatus is positioned and passes from the camera, through at least one of the plurality of interference filters, through the sensor port, to the sample port.

12. A method for measuring a color of a non-solid colored sample, the method comprising:
    positioning the sample near a sample port of an integrating sphere;
    illuminating the sample with diffuse illumination, using the integrating sphere;
    capturing a plurality of images of the sample through a sensor port of the integrating sphere, subsequent to the illuminating, wherein each image of the plurality of images is captured using a different color filter of a plurality of color filters, and wherein at least one of the plurality of images depicts a set of registration marks affixed to an interior surface of the integrating sphere, wherein the set of registration marks comprises:
        a first registration mark having a first center;
        a second registration mark having a second center that is non-overlapping with the first center, where the first registration mark and second registration mark collectively provide four constraints for correcting up to four registration errors in an image of the plurality of images, wherein the up to four registration errors include at least one of: a displacement of the image of the plurality of images along an x axis of a coordinate plane, a displacement of the image of the plurality of images along a y axis of the coordinate plane, and a dilation of the image of the plurality of images; and a third registration mark providing a constraint for correcting a rotation drift of the image of the plurality of images; and computing a reflectance of a portion of the sample, based on the plurality of images.

13. The method of claim 12, wherein the capturing is performed using a monochrome camera, and an optical axis of the monochrome camera extends in a parallel orientation relative to a support surface upon which the integrating sphere is positioned and passes from the monochrome camera, through the color filter, through the sensor port, to the sample port.

14. The method of claim 12, wherein at least one of the plurality of images depicts a reference channel comprising a portion of an interior surface of the integrating sphere.

15. The method of claim 12, wherein the computing comprises:

for at least one pixel of the plurality of images, computing a ratio for the at least one pixel, where the ratio relates a light intensity reflected from the at least one pixel to a light intensity reflected from a white calibration target.

16. A non-transitory computer readable storage device containing an executable program for measuring a color of a non-solid colored sample, where the program performs steps comprising:

positioning the sample near a sample port of an integrating sphere;

illuminating the sample with diffuse illumination, using the integrating sphere;

capturing a plurality of images of the sample through a sensor port of the integrating sphere, subsequent to the illuminating, wherein each image of the plurality of images is captured using a different color filter of a plurality of color filters, and wherein at least one of the plurality of images depicts a set of registration marks affixed to an interior surface of the integrating sphere, wherein the set of registration marks comprises:

a first registration mark having a first center;

a second registration mark having a second center that is non-overlapping with the first center, where the first registration mark and second registration mark collectively provide four constraints for correcting up to four registration errors in an image of the plurality of images, wherein the up to four registration errors include at least one of: a displacement of the image of the plurality of images along an x axis of a coordinate plane, a displacement of the image of the plurality of images along a y axis of the coordinate plane, and a dilation of the image of the plurality of images; and a third registration mark providing a constraint for correcting a rotation drift of the image of the plurality of images; and computing a reflectance of a portion of the sample, based on the plurality of images.

17. The computer readable storage device of claim 16, wherein at least one of the plurality of images depicts a reference channel comprising a portion of an interior surface of the integrating sphere.

18. An apparatus for measuring a color of a non-solid colored sample, the apparatus comprising:

an integrating sphere comprising:
a sensor port;
a sample port;
a light port; and
a plurality of registration marks having non-overlapping centers and affixed to an interior surface of the integrating sphere, outside a periphery of the sample port, wherein the plurality of registration marks comprises:
a first registration mark;
a second registration mark, where the first registration mark and second registration mark collectively provide four constraints for correcting up to four registration errors in an image, wherein the up to four registration errors include at least one of: a displacement of the image along an x axis of a coordinate plane, a displacement of the image along a y axis of the coordinate plane, and a dilation of the image; and
a third registration mark providing a constraint for correcting a rotation drift of the image;

a light positioned near the light port;

a camera positioned near the sensor port; and a plurality of interference filters positioned between the integrating sphere and the light source, wherein an optical axis of the camera extends from the camera, through the sensor port, to the sample port.

19. The apparatus of claim 18, further comprising:

a reference channel comprising a portion of the interior surface of the integrating sphere and positioned outside the periphery of the sample port.

20. The apparatus of claim 18, wherein the plurality of interference filters is configured as a filter wheel.

* * * * *